(12) United States Patent
Deininger et al.

(10) Patent No.: US 8,859,721 B2
(45) Date of Patent: Oct. 14, 2014

(54) PROCESS FOR WORKING UP PARTICULATE CRUDE POLYOXYMETHYLENE

(75) Inventors: Jürgen Deininger, Oftersheim (DE); Jürgen Demeter, Frankenthal (DE); Rüdiger Häffner, Neustadt (DE); Ralf Schulz, Speyer (DE); Achim Stammer, Freinsheim (DE)

(73) Assignee: BASF SE (DE)

( * ) Notice: Subject to any disclaimer, the term of this patent is extended or adjusted under 35 U.S.C. 154(b) by 26 days.

(21) Appl. No.: 13/570,904

(22) Filed: Aug. 9, 2012

(65) Prior Publication Data

US 2013/0041126 A1    Feb. 14, 2013

Related U.S. Application Data

(60) Provisional application No. 61/522,270, filed on Aug. 11, 2011.

(30) Foreign Application Priority Data

Aug. 11, 2011    (EP) .................................. 11177294

(51) Int. Cl.
| | |
|---|---|
| *C08F 6/16* | (2006.01) |
| *C08G 2/38* | (2006.01) |
| *C08L 59/00* | (2006.01) |
| *C08G 2/00* | (2006.01) |
| *C08G 2/18* | (2006.01) |

(52) U.S. Cl.
CPC .. *C08G 2/00* (2013.01); *C08G 2/38* (2013.01); *C08L 59/00* (2013.01); *C08G 2/18* (2013.01)
USPC ........... 528/499; 528/480; 528/491; 528/230; 528/245; 528/270

(58) Field of Classification Search
CPC ............ C08F 6/00; C08F 6/001; C08F 6/005; C08G 2/00; C08L 59/00; C08L 59/04; C08J 3/12
USPC .......... 528/480–503, 220, 230, 245, 246, 270
See application file for complete search history.

(56) References Cited

U.S. PATENT DOCUMENTS

3,193,533 A * 7/1965 Manwiller et al. ............ 528/239
5,587,449 A   12/1996 Fleischer et al.
(Continued)

FOREIGN PATENT DOCUMENTS

EP    0699695 A2    3/1996
EP    1418190 A1    5/2004
(Continued)

OTHER PUBLICATIONS

Machine translation of WO 2006/105970.*
(Continued)

*Primary Examiner* — Frances Tischler
(74) *Attorney, Agent, or Firm* — Drinker Biddle & Reath LLP

(57) ABSTRACT

The invention relates to a process for working up particulate crude polyoxymethylene, which comprises the following steps:
(a) introduction of the particulate crude polyoxymethylene into an extraction column (13) operated at a pressure in the range from 1 to 6 bar,
(b) introduction of a polar extractant into the extraction column (13) with a temperature in the range from 95 to 140° C. and a pressure in the range from 1 to 6 bar,
wherein from 10 to 1000 ppm, based on the amount of polar extractant introduced, of a buffer substance which buffers in the pH range from 7.5 to 11.5 are introduced into the extraction column (13).

10 Claims, 1 Drawing Sheet

(56) References Cited

U.S. PATENT DOCUMENTS

2004/0097691 A1    5/2004    Muck et al.
2007/0073007 A1*   3/2007    Harashina ............... 525/472

FOREIGN PATENT DOCUMENTS

EP    1688461 A1       8/2006
WO    WO-2006105970 A1    10/2006

OTHER PUBLICATIONS

International Search Report for PCT/EP2012/064767, dated Apr. 10, 2013.

Bates, R., "Amine Buffers for pH Control", Annals of the New York Academy of Sciences, Wiley Blackwell Publishing, Inc., Bd. 92, Part 1, (1961), pp. 341-356.

* cited by examiner

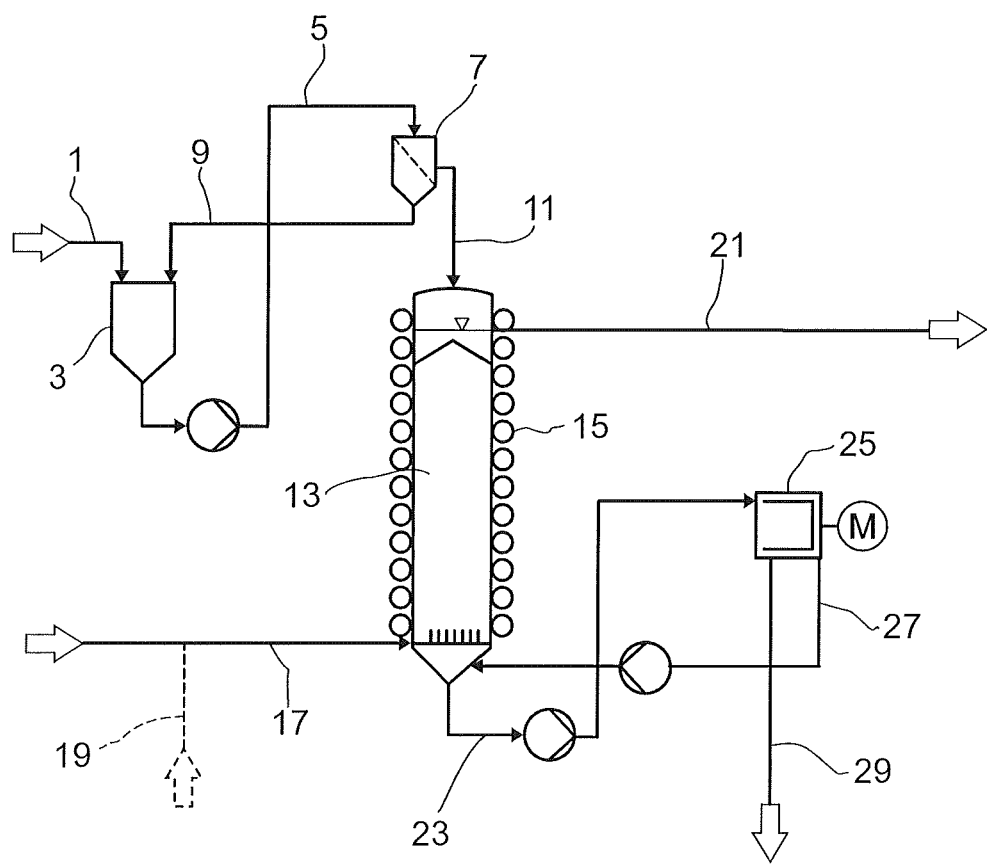

PROCESS FOR WORKING UP PARTICULATE CRUDE POLYOXYMETHYLENE

CROSS-REFERENCE TO RELATED APPLICATIONS

This application claims the benefit of European Application No. 11177294.3, filed Aug. 11, 2011, and U.S. Provisional Application No. 61/522,270, filed Aug. 11, 2011, both of which are incorporated herein by reference.

The invention proceeds from a process for working up particulate crude polyoxymethylene, which comprises the following steps:
(a) introduction of the particulate crude polyoxymethylene into an extraction column operated at a pressure in the range from 1 to 6 bar,
(b) introduction of a polar extractant into the extraction column with a temperature in the range from 95 to 140° C. and a pressure in the range from 1 to 6 bar.

The preparation of polyoxymethylene can be carried out in bulk or in solution, under atmospheric pressure or under superatmospheric pressure. For example, it is possible to carry out the reaction in a homogeneous phase in a polymerization reactor. Here, cyclic formaldehyde oligomers are copolymerized with cyclic acetals in the presence of an initiator. The initiator is subsequently deactivated by addition of basic substances and the resulting product is pelletized at the reactor outlet. To remove residual monomers and other impurities, the pelletized material produced in this way is extracted by means of a solvent and subsequently dried.

The process for preparing polyoxymethylene is described, for example, in EP-A 0 699 695. In the process described here, the extraction is carried out by means of water or an alcohol having up to three carbon atoms. In addition, basic substances can be added since the extraction is to be carried out in the basic range. The temperature of the extraction is in the range from 30 to 130° C.

A further process for the preparation of polyoxymethylene and the subsequent work-up thereof is described in WO-A 2006/105970. In the process disclosed here, at least one monomer which forms —CH$_2$—O— units is polymerized, optionally together with a copolymer and an initiator, in the homogeneous phase in a polymerization zone, unstable chain ends are reacted and end-capped at temperatures above the melting point of the polymer produced and the initiator is deactivated by addition of a deactivator. In a further step, the polymer is depressurized to remove residual monomers and, after pelletization, the pelletized material is extracted to remove remaining residual monomers. The pelletized material is finally dried. As extractant, use is made of, for example, water having a temperature in the range from 100 to 170° C.

A corresponding process is also described in EP-A 1 418 190.

Disadvantages of the processes known from the prior art for working up the crude polyoxymethylene are that the pelletized material has a yellow color after the extraction and, in addition, formaldehyde is split off in the extraction. In the water used for the extraction, the formaldehyde forms formic acid, as a result of which the pH of the extractant used decreases. However, the lower pH catalyzes the degradation of the polymer, as a result of which further formaldehyde is liberated.

This problem occurs, in particular, when the extraction is carried out at temperatures above 95° C. However, a lower extraction temperature results in the effect of the extraction being insufficient, in particular for use of the polyoxymethylene in the food or hot water sector and an excessively large amount of residual monomers remaining in the polymer.

It is therefore an object of the present invention to provide a process for working up particulate crude polyoxymethylene, in which, firstly, formaldehyde formation is suppressed and, secondly, the yellow color is reduced.

The object is achieved by a process for working up particulate crude polyoxymethylene, which comprises the following steps:
(a) introduction of the particulate crude polyoxymethylene into an extraction column operated at a pressure in the range from 1 to 6 bar,
(b) introduction of a polar extractant into the extraction column with a temperature in the range from 95 to 140° C. and a pressure in the range from 1 to 6 bar,
wherein from 10 to 1000 ppm, based on the amount of polar extractant introduced, of a buffer substance which buffers in the pH range from 7.5 to 11.5 are introduced into the extraction column.

The addition of the buffer substance enables the basicity to be maintained in the extraction, so that the formation of formaldehyde by decomposition of the polyoxymethylene can be reduced. In addition, it has been found that the addition of the buffer substance leads to a product which has less, if any, yellow discoloration.

The particulate crude polyoxymethylene comes from a polymerization known per se for preparing polyoxymethylene, in which at least one monomer which forms —CH$_2$—O— units is, optionally together with one or more comonomers and at least one initiator and optionally a chain regulator, polymerized in the homogeneous phase.

Suitable monomers which are used for the polymerization are, for example, trioxane or formaldehyde. Suitable initiators are, for example, boron trifluoride or perchloric acid.

These polymers have, quite generally, at least 50 mol % of recurring —CH$_2$O— units in the main polymer chain. Polyoxymethylene homopolymers are generally unbranched linear polymers which generally comprise at least 80%, preferably at least 90%, of oxymethylene units. The homopolymers are generally prepared by polymerization of formaldehyde or its cyclic oligomers such as trioxane or tetraoxane, preferably in the presence of suitable catalysts.

Homopolymers of formaldehyde or trioxane are polymers whose hydroxyl end groups are chemically stabilized in a known manner against degradation, for example by esterification or etherification. Copolymers are polymers of formaldehyde or its cyclic oligomers, in particular trioxane, and cyclic ethers, cyclic acetals and/or linear polyacetals.

Polyoxymethylene copolymers can comprise, in addition to the recurring —CH$_2$O— units, up to 50 mol %, preferably from 0.1 to 20 mol %, in particular from 0.3 to 10 mol % and very particularly preferably from 0.02 to 2.5 mol %, of recurring

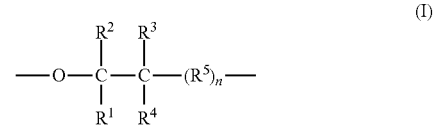

units, where
R$^1$ to R$^4$ are each, independently of one another, a hydrogen atom, a C$_1$-C$_4$-alkyl group or a halogen-substituted alkyl group having from 1 to 4 carbon atoms and $R^5$ is a —$CH_2$— group, $CH_2O$ group, a $C_1$-$C_4$-alkyl- or $C_1$-$C_4$-haloalkyl-substituted methylene group or a corresponding oxymethylene group and n is from 0 to 3.

These groups can advantageously be introduced into the copolymers by ring opening of cyclic ethers. Preferred cyclic ethers are those of the formula

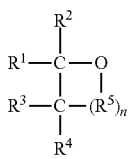

(II)

where $R^1$ to $R^5$ and n are as defined above.

Mention may be made, merely by way of example, of ethylene oxide, 1,2-propylene oxide, 1,2-butylene oxide, 1,3-butylene oxide, 1,3-dioxane, 1,3-dioxolane and 1,3-dioxepane as cyclic ethers and linear oligoformals or polyformals such as polydioxolane or polydioxepane as comonomers.

Furthermore, the polymers can comprise a crosslinker. As crosslinker, use is made, for example, of a bifunctional compound which comprises two higher cyclic ethers of the general formula (II) which are joined to one another via the unit Z.

The polyoxymethylene polymer used for the process of the invention preferably comprises a bifunctional compound of the formula

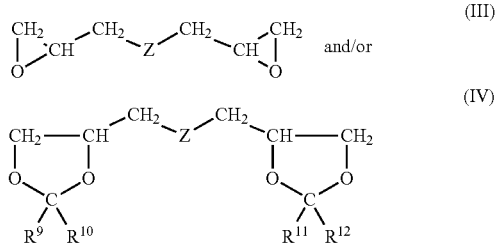

where

Z is a chemical bond, —O—, —$OR^6O$—, —$R^7$—, —$R^7OR^8$—, —(O—$CH_2$—$CH_2$)$_n$—O— or —(O—$CH_2$)$_n$—O—, where $R^6$ is $C_1$-$C_8$-alkylene or $C_3$-$C_8$-cycloalkylene, $R^7$ and $R^8$ are each, independently of one another, a $C_1$-$C_{12}$-alkylene group and n is an integer from 1 to 4, as crosslinker.

Z is preferably a chemical bond, —O— or —$OR^6O$—, where $R^6$ is as defined above.

The linkage Z is preferably selected so that it is stable to the cationically active catalysts and initiators known for the polymerization of formaldehyde and its cyclic oligomers such as trioxane and tetroxane, i.e. the linkage Z must not lead significantly to termination, chain transfer and other reactions.

The radicals $R^9$ to $R^{12}$ in the bifunctional compound of the formula (IV) are each, independently of one another, hydrogen or a $C_1$-$C_4$-alkyl group. The radicals $R^9$ to $R^{12}$ are preferably hydrogen, and very particular preference is given to using a bifunctional compound of the formula (IV) in which Z is oxygen and the radicals $R^9$ to $R^{12}$ are each hydrogen as crosslinker.

Preferred monomers of this type are ethylene diglycide, diglycidyl ether and diethers derived from glycidyls and formaldehyde, dioxane or trioxane in a molar ratio of 2:1 and also diethers derived from 2 mol of glycidyl compound and 1 mol of an aliphatic diol having from 2 to 8 carbon atoms, for example diglycidyl ethers of ethylene glycol, 1,4-butanediol, 1,3-butanediol, cyclobutane-1,3-diol, 1,2-propanediol and cyclohexane-1,4-diol, to name only a few examples.

Particular preference is given to using diglycerol diformal as crosslinker. This can be prepared relatively simply and in a good yield from linear diglycerol and formaldehyde (as aqueous solution, paraformaldehyde or trioxane) in the presence of an acidic catalyst. 4,4'-Bis(1,3-dioxolanylmethyl)oxide is obtained as main product. This has a structure corresponding to the general structure (IV) in which Z is oxygen and the radicals $R^9$ to $R^{12}$ are each hydrogen.

When diglycerol, which comprises predominantly the linear compound but also branched isomers, is used, the reaction with formaldehyde leads to a mixture of isomers such as glycerol diformals, whose main constituent is the abovementioned compound. This mixture is just as suitable as the pure substance. The glycerol diformal is usually used in amounts of from 0.01 to 1% by weight, preferably in the range from 0.05 to 0.3% by weight and in particular in the range from 0.1 to 0.2% by weight, based on the weight of the trioxane used.

After the polymerization is complete, unstable chain ends are reacted and end-capped.

At the same time, the initiator is deactivated by addition of deactivators in a deactivation zone following the polymerization zone. Deactivation of the initiator is preferably carried out at temperatures below the melting point of the polymer. Suitable deactivators are, for example, sodium methoxide, sodium tetraborate, glycerophosphate, which are used in an amount of from 5 to 10 000 ppm based on the mass of polyoxymethylene prepared.

The polymer leaving the deactivation zone is heated by means of a heat transfer medium to a temperature which is at least 30° C. above the melting point of the polymer/monomer mixture present, typically to a temperature of 190° C. The polymer melt produced in this way is subsequently transferred to a depressurization zone which is operated at a pressure above ambient pressure, preferably at a pressure in the range from 1.1 to 6 bar.

In a next step, at least 95% of the residual monomers and the formaldehyde formed in the polymerization zone are removed in a degassing zone at a pressure above ambient pressure, for example at 3 bar. The polymer melt which has been worked up in this way is transferred to an extruder in which additives can initially be added in order to adjust the properties of the polyoxymethylene and in which residual degassing for further removal of monomers is subsequently carried out. The polymer leaving the extruder is pelletized to give particulate crude polyoxymethylene and worked up further according to the invention.

Apart from the above-described polymerization in a homogeneous phase, the particulate crude polyoxymethylene can also originate from any other preparation of polyoxymethylene.

To remove residual monomers still comprised in the polymer, the particulate crude polyoxymethylene is extracted according to the invention. For this purpose, the particulate crude polyoxymethylene is introduced into an extraction column into which a polar extractant is then introduced. Residual monomers and impurities still comprised in the particulate crude polyoxymethylene are removed by means of the polar extractant. These dissolve in the polar extractant and are thus leached from the crude polyoxymethylene.

Preference is given to using water as polar extractant. It is likewise possible to use short-chain alcohols or mixtures thereof with water. The extraction is carried out at a temperature above 95° C., preferably above 100° C. and in particular in the range from 120 to 130° C. Carrying out the extraction at a temperature above 95° C. leads to a product which has a purity sufficient to allow use in the food sector.

The pressure at which the extraction is carried out is selected so that the extractant does not vaporize at the temperature selected. When water and a temperature below 100° C. are used, the extraction can still be carried out at ambient pressure. However, preference is given to carrying out the extraction at a pressure above ambient pressure, preferably at a pressure in the range from 1 to 6 bar. The extraction is particularly preferably carried out at a pressure in the range from 2 to 3 bar.

The extraction can be carried out in cocurrent or in countercurrent. The extraction is preferably carried out in countercurrent. When the extraction is carried out in countercurrent, preference is given to introducing the particulate crude polyoxymethylene at the top of the extraction column and introducing the polar extractant via a distributor in the lower region of the column. The loaded extractant after the extraction is taken off at the top of the column and taken from the process. The loaded extractant can be disposed of or it is purified and fed back to the process. Purification can, for example, be carried out by distillation.

According to the invention, the extraction is carried out in an extraction column. Here, the column can have customary internals. It is also possible to configure the extraction column as, for example, a mixer-settler apparatus.

According to the invention, from 10 to 1000 ppm, preferably from 50 to 300 ppm and in particular from 80 to 200 ppm, based on the amount of polar extractant introduced, of a buffer substance which buffers in the pH range from 7.5 to 11.5, preferably in the pH range from 8 to 10 and in particular in the pH range from 8 to 9, are introduced into the extraction column. The addition of the buffer substance prevents the polar extractant from becoming acidic, i.e. the pH dropping below 7. Such a low pH leads to polymer degradation in the extraction column being catalyzed, resulting in formation of formaldehyde. This is converted further into formic acid, as a result of which the pH in the polar extractant drops further. The addition of the buffer substance prevents the lowering of the pH in the polar extractant and in this way reduces degradation of the polymer to form formaldehyde which is converted further into formic acid.

The degradation of the polymer occurs, in particular, at temperatures in the extraction of more than 95° C. However, lowering the temperature is not possible since an extraction at lower temperatures is not sufficient to produce, in particular, polyoxymethylene which can also be used in food applications or hot water applications. It has also been found that the addition of the buffer substance reduces or can completely prevent the yellow coloration of the polyoxymethylene.

In a first embodiment, the buffer substance can be mixed into the polar extractant before introduction into the extraction column. As an alternative, it is also possible to introduce the buffer substance and the polar extractant simultaneously into the extraction column, with the introduction being able to be effected via separate inlets in this case. When the polar extractant and the buffer substance are introduced via separate inlets into the extraction column, it is also advantageous for the amount of the buffer substance added to be matched in each case to the actual amount of the polar extractant introduced.

When the buffer substance is mixed into the polar extractant before introduction into the extraction column, it is possible for the buffer substance to be introduced via a metering line into the feed line for the polar extractant. In this case, the metering line for the buffer substance opens into the feed line for the polar extractant, with the metering line being able to open into the feed line for the extractant at any desired point. It is advantageous for the metering line for the buffer substance to open into the feed line for the polar extractant at a spacing such that the buffer substance mixes completely with the extractant in the feed line for the polar extractant after the junction with the metering line. However, it is also possible to provide the metering line at a smaller spacing in the feed line for the polar extractant, so that incompletely mixed buffer substance and polar extractant are also introduced into the extraction column and complete mixing occurs only in the extraction column.

In an alternative embodiment, it is also possible to mix the polar extractant and the buffer substance in a reservoir. In this case, polar extractant and buffer substance are introduced in the desired amount in each case into the reservoir. To mix the extractant and the buffer substance, it is also advantageous for the reservoir to have a mixing device, for example a stirrer. By means of this, the buffer substance and the extractant can be mixed so that a mixture having a composition comprising sufficient buffer substance is always taken from the reservoir.

A buffer substance suitable for the process of the invention preferably comprises sodium tetraborate solution and glycerophosphate solution.

Preference is given to a buffer substance comprising sodium tetraborate and glycerophosphate. Preference is given to using water, a 2.5% strength sodium tetraborate solution and a 50% strength glycerophosphate solution for producing the buffer substance. A suitable buffer substance comprises, for example, from 150 to 250 l, preferably from 160 to 190 l, for example 175 l, of water, from 1 to 5 l, preferably from 2 to 4 l, for example 2.5 l, of sodium tetraborate solution and from 100 to 500 ml, preferably from 200 to 350 ml, for example 300 ml, of glycerophosphate solution.

After the extraction has been carried out, the particulate polyoxymethylene is taken from the extraction column. For this purpose, it is possible, for example, for the particulate polyoxymethylene to be taken via a lock from the extraction column. For this purpose, the particulate polyoxymethylene firstly collects at the bottom of the column and can be discharged from the bottom of the column through the lock. This has the advantage that the extractant remains essentially in the extraction column and can be taken off via a separate outlet and be recirculated. The polyoxymethylene taken off comprises only residues of polar extractant which can be removed in a simple way in subsequent steps.

For this purpose, it is possible, for example, to separate the particulate polyoxymethylene from the polar extractant in a pelletized material centrifuge. Apart from separation in a pelletized material centrifuge, any other separation of particulate polyoxymethylene and polar extractant is also conceivable. Further suitable apparatuses in which the particulate polyoxymethylene can be separated from the polar extractant are, for example, sieves.

Since residues of polar extractant are usually still present on the polyoxymethylene in the separation of the polar extractant from the particulate polyoxymethylene, it is also advantageous to dry the particulate polyoxymethylene in a subsequent step. For this purpose, the pelletized material centrifuge is preferably followed by at least one dryer. Suitable dryers are any dryers known to those skilled in the art. Suitable dryers are, for example, fluidized-bed dryers, shaft dryers and crossflow dryers.

An embodiment of the invention is shown in the FIGURE and is explained in more detail in the following description.

The single FIGURE schematically shows a process flow diagram of the process of the invention.

A pelletized polyoxymethylene is introduced via a POM feed line 1 into a reservoir 3. The pelletized polyoxymethylene is mixed with a transport medium. A suitable transport medium is, for example, water.

From the reservoir 3, the pelletized polyoxymethylene is conveyed together with the transport medium via a feed line 5 firstly into a separator 7. In the separator 7, the transport medium is separated from the pelletized polyoxymethylene. A suitable separator 7 is, for example, a cyclone separator.

The transport medium separated off in the separator 7 is conveyed via a return line 9 back to the reservoir 3. The pelletized polyoxymethylene which has been separated from the transport medium is fed via a pelletized material line 11 to an extraction column 13.

To transport the pelletized polyoxymethylene through the pelletized material line 11, it is possible, for example, to provide a star feeder by means of which the pelletized polyoxymethylene is transported through the pelletized material line 11.

To heat the extraction column 13, a heating coil 15 which surrounds the extraction column 13 is provided in the embodiment shown here. As an alternative to the heating coil shown here, it is also possible to provide a column with a double wall by means of which the extraction column 13 is heated. The heating of the extraction column 13 is in this case preferably effected by means of steam.

A polar extractant is fed in via an extractant line 17 at the bottom of the extraction column 13. The polar extractant is preferably water. According to the invention, a buffer substance is mixed into the polar extractant fed in via the extractant line 17, with the proportion of buffer substance in the polar extractant being in the range from 10 to 1000 ppm.

The buffer substance can be introduced via a metering line 19 which opens into the extractant line 17 and is shown as a broken line here. As an alternative, it is also possible, for example, to mix the extractant with the buffer substance in a reservoir (not shown) and then introduce the mixture via the extractant line 17 into the extraction column 13.

Loaded polar extractant is taken off at the top of the extraction column 13 via an outlet line 21. At the bottom of the extraction column 13, is taken off at the bottom of the extraction column 13 via a product line 23. The pelletized polyoxymethylene which is taken off at the bottom of the extraction column 13 via the product line 23 is introduced into a pelletized material centrifuge 25 for separation from the polar extractant. As an alternative to a pelletized material centrifuge 25, any other apparatus by means of which the pelletized polyoxymethylene can be separated from the polar extractant is also suitable. The polar extractant which is separated off from the pelletized polyoxymethylene in the pelletized material centrifuge 25 is recirculated via a return line 27 to the extraction column 13. The pelletized polyoxymethylene which has been separated from the polar extractant is taken off from the pelletized material centrifuge 25 via a product line 29. The product line 29 can lead, for example, to a dryer in which the pelletized polyoxymethylene is dried further.

EXAMPLES 3100 g of pelletized polyoxymethylene are firstly introduced into an extraction column. After introduction of the pelletized polyoxymethylene, the extraction column is made inert by means of nitrogen and heated to the temperature at which the extraction is to be carried out. After heating, polar extractant is introduced from a reservoir into the column over a period of about 15 minutes. For this purpose, the polar extractant is heated in a heat exchanger before introduction into the extraction column. The amount of extractant introduced into the extraction column is regulated by means of a pump. Regulation is effected by means of a difference weighing.

As soon as the column has been filled with the extractant and heated, the feed is regulated to the desired volume flow. This was 103 l/h in all experiments. To compensate for decreases in temperature, the circulation line can be heated by means of a heat exchanger.

The pressure set in the column is kept constant by means of a pressure regulator. The extractant leaves the column at the top of the column via a regulating valve of the pressure regulator. The extractant is cooled in a heat exchanger and passed to waste water.

Comparative Example 1

The extraction is carried out at a temperature of 130° C. and a pressure of 5 bar. The ratio of water to pelletized material was 10:1. The extraction time is 3 hours.

After carrying out the extraction, the resulting pelletized polyoxymethylene has a formaldehyde content of 11 ppm, a color number DE of 2.48, a color number DB of 1.46 and an oligomer content of 94 ppm. The proportion of trioxane and tetroxane was below the detection limit. In order to obtain a pelletized polyoxymethylene which can be used in the food industry, the formaldehyde content would have had to be less than 8 ppm and the oligomer content would have had to be less than 70 ppm. The maximum formaldehyde content and the maximum oligomer content are thus exceeded.

Comparative Example 2

The extraction was carried out under the same conditions as in comparative example 1 but the extraction time was now 6 hours instead of 3 hours. After an extraction time of 6 hours, the formaldehyde content was 4 ppm, the color number DE was 4.33, the color number DB was 1.39 and the proportion of trioxane, tetroxane and oligomers was below the detection limit.

Although the desired formaldehyde content and the desired oligomer content are achieved when the extraction time is increased, the color number DE also increases and exceeds the required maximum value of 2.5.

Comparative Example 3

The extraction is carried out as described in comparative example 1. 0.1% of triethylamine is additionally added as auxiliary to the extractant. The extraction time was 1 hour.

After an extraction time of 1 hour with addition of 0.1% of triethylamine, the pelletized material still comprises 10 ppm of formaldehyde, the color number DE was 3.08, the color number DB was 2.95, the proportion of trioxane was 693 ppm and the proportion of oligomers was 839 ppm. All measured values therefore exceed the required specification.

Comparative Example 4

The experiment was carried out under the conditions as in comparative example 3, but a ratio of water to pelletized material of 6:1 was set instead of a ratio of water to pelletized material of 10:1.

After an extraction time of 1 hour, the formaldehyde content was 10 ppm, the color number DE was 3.16, the color number DB was 3.00, the trioxane content was 527 ppm and the oligomer content was 804 ppm. Owing to the required specifications of the formaldehyde content of less than 8 ppm, a color number DE of less than 2.5, a color number DB of less than 2.5 and an oligomer content of not more than 70 ppm and the requirement that no trioxane can be detected, all measured values exceed the required specifications.

Comparative Example 5

The experiment was carried out as in comparative example 4 but the extraction time was increased to 6 hours.

After an extraction time of 6 hours, the formaldehyde content measured was 6 ppm, the color number DE was 4.81, the color number DB was 4.15, the trioxane content was 783 ppm. The proportion of tetroxane and oligomers was below the detection limit and thus met the specification. However, the required specification was not achieved by the color numbers DE and DB and the trioxane content.

Comparative Example 6

The experimental conditions correspond to those of comparative example 5, but the extraction time was increased to 9 hours.

After an extraction time of 9 hours, the formaldehyde content was 6 ppm, the color number DE was 3.16, the color number DB was 3.00, the trioxane content was 527 ppm and the proportion of tetroxane and oligomers was below the detection limit. Thus, the color number DE, the color number DB and the trioxane content are above the required specification values even when the extraction time is extended to 9 hours.

Comparative Example 7

The extraction is carried out under the same conditions as in comparative example 1. Diethylamine is additionally added as extraction auxiliary to the extractant and the pH is in this way set to 9.2. The extraction time was 1 hour, the ratio of water to pelletized material was 10:1.

With the addition of diethylamine and at an extraction time of 1 hour, the proportion of formaldehyde is 7 ppm, the color number DE is 3.03, the color number DB is 2.59 and the oligomer content is 72 ppm. The color numbers DE and DB and the oligomer content are thus above the required specification.

Comparative Example 8

The extraction is carried out as described in comparative example 1, but triethanolamine is added to the extractant in such an amount that the pH is set to 9.8. The extraction time was 2 hours.

After extraction for 2 hours, the formaldehyde content was 8 ppm, the color number DE was 3.59, the color number DB was 2.57 and the oligomer content was 106, so that the color numbers DE and DB and the oligomer content are above the required specification values when an extractant with triethanolamine is used.

Comparative Example 9

The extraction is carried out as described in comparative example 1. 10% of a standard buffer substance for a pH of 8 is additionally mixed into the extractant. The extraction time was 6 hours. Using the water adjusted to a pH of 8 by means of standard buffer substance as polar extractant, the formaldehyde content was 8 ppm, the color number DE was 3.59, the color number DB was 2.57 and the oligomer content was 106. The color numbers DE and DB and the oligomer content are thus above the required specification.

Comparative Example 10

The extraction is carried out in a manner analogous to the extraction carried out in comparative example 1. As a difference from comparative example 1, a standard buffer substance for a pH of 6 is mixed into the water used as extractant. The extraction time was 2 hours.

After an extraction time of 2 hours, the formaldehyde content was 5 ppm, the color number DE was 3.29, the color number DB was 2.63, contents of trioxane, tetroxane and oligomers could not be detected.

Comparative Example 11

The experimental procedure corresponds to that in comparative example 10, but the extraction time was increased to 6 hours.

After an extraction time of 6 hours, a pelletized polyoxymethylene having a formaldehyde content of 5 ppm, a color number DE of 6.39, a color number DB of 4.16 and a trioxane content of 186 ppm was obtained. The proportion of tetroxane and oligomers was below the detection limit.

As in comparative example 10, the color numbers DE and DB immediately after carrying out the extraction were above the required specification values. In addition, the proportion of trioxane was too high in the extraction carried out in comparative example 11.

Example 1

The extraction was carried out as described in comparative example 1. The extraction time was 3 hours and, as a difference from the extraction described in comparative example 1, water to which 10% of a buffer substance had been added was used as extractant. The buffer substance used was produced by mixing 175 kg of water with 2.5 liters of a 2.5% strength sodium tetraborate solution and 300 ml of a 50% strength glycerophosphate solution.

After an extraction time of 3 hours, the formaldehyde content was 6 ppm, the color number DE was 1.98, the color number DB was 1.94 and the oligomer content was 61 ppm.

Example 2

The extraction was carried out as in example 1 but the extraction time was increased from 3 hours to 6 hours.

After an extraction time of 6 hours, the formaldehyde content of the pelletized material was 6 ppm, the color number DE was 2.33, the color number DB was 2.32 and the oligomer content was 78 ppm.

The buffer substance used in examples 1 and 2 thus gave a pelletized polyoxymethylene which meets the required specification values in respect of the formaldehyde content of less than 8 ppm, the color numbers DE and DB of less than 2.5 and the undetectable proportion of trioxane, tetroxane and oligomers of less than 100 ppm.

LIST OF REFERENCE NUMERALS

1 POM feed line
3 Reservoir

5 Transport line
7 Separator
9 Return line
11 Pelletized material line
13 Extraction column
15 Heating coil
17 Extractant line
19 Metering line
21 Outlet line
23 Product line
25 Pelletized material centrifuge
27 Return line
29 Product line

The invention claimed is:

1. A process for working up particulate crude polyoxymethylene, which comprises the following steps:
   (a) introduction of the particulate crude polyoxymethylene into an extraction column (13) operated at a pressure in the range from 1 to 6 bar,
   (b) introduction of a polar extractant into the extraction column (13) with a temperature in the range from 95 to 140° C. and a pressure in the range from 1 to 6 bar,
   wherein from 10 to 1000 ppm, based on the amount of polar extractant introduced, of a buffer substance which buffers in the pH range from 7.5 to 11.5 are introduced into the extraction column (13);
   wherein the buffer substance is selected from among sodium tetraborate, sodium glycerophosphate and mixtures thereof.

2. The process according to claim 1, wherein the buffer substance is mixed with the polar extractant before introduction into the extraction column (13).

3. The process according to claim 1, wherein the buffer substance and the polar extractant are introduced via separate inlets into the extraction column (13).

4. The process according to claim 2, wherein the buffer substance is fed in via a metering line (19) into the feed line (17) for the polar extractant.

5. The process according to claim 2, wherein the polar extractant and the buffer substance are mixed in a reservoir.

6. The process according to claim 1, wherein the polar extractant and the particulate crude polyoxymethylene are fed in countercurrent into the extraction column (13).

7. The process according to claim 1, wherein the polar extractant is water.

8. The process according to claim 1, wherein particulate polyoxymethylene is taken off via a lock from the extraction column.

9. The process according to claim 8, wherein the particulate polyoxymethylene is separated from the polar extractant in a pelletized material centrifuge (25).

10. The process according to claim 9, wherein the pelletized material centrifuge (25) is followed by at least one dryer in order to dry the particulate polyoxymethylene.

* * * * *